United States Patent [19]
Varpula et al.

[11] Patent Number: 5,530,346
[45] Date of Patent: Jun. 25, 1996

[54] METHOD AND APPARATUS FOR DETERMINING THE SIZE AND SHAPE OF A SLOT BY MEASURING A MAGNETIC FIELD PRODUCED ALONG AN EDGE THEREOF

[75] Inventors: Timo T. Varpula, Vanta; Heikki J. Seppä, Helsinki; Mayri O. Sundström, Kajaani, all of Finland

[73] Assignee: Valmet-Tampella Oy, Tampere, Finland

[21] Appl. No.: 347,411

[22] PCT Filed: Jun. 9, 1993

[86] PCT No.: PCT/FI93/00251

§ 371 Date: Dec. 30, 1994

§ 102(e) Date: Dec. 30, 1994

[87] PCT Pub. No.: WO93/25864

PCT Pub. Date: Dec. 23, 1993

[30] Foreign Application Priority Data

Sep. 6, 1992 [FI] Finland .................................. 922660

[51] Int. Cl.⁶ .............................. G01B 7/14; G01R 33/00
[52] U.S. Cl. ................................. 324/207.12; 324/207.26; 324/226
[58] Field of Search .................... 324/207.11, 207.12, 324/207.22, 207.26, 226, 262

[56] References Cited

U.S. PATENT DOCUMENTS 4,470,013  9/1984  Possémé .............................. 324/207.26

*Primary Examiner*—Walter E. Snow
*Attorney, Agent, or Firm*—Cohen, Pontani, Lieberman, Pavane

[57] ABSTRACT

A method and an apparatus for determining the size and shape of a slot, for measuring, e.g., the profile of the discharge opening (slice) of a paper machine. In the method, using at least two magnetometers attached to an edge of the slot, the magnetic field depending on the size and shape of the slot is measured. An alternating electrical current is applied to a current conductor attached to the edge of the slot to create an alternating magnetic field, measurement of the alternating magnetic field is phase-locked with the applied electrical circuit, and the size and shape of the slot are calculated from the measured values of the magnetic field.

26 Claims, 3 Drawing Sheets

METHOD AND APPARATUS FOR DETERMINING THE SIZE AND SHAPE OF A SLOT BY MEASURING A MAGNETIC FIELD PRODUCED ALONG AN EDGE THEREOF

BACKGROUND OF THE INVENTION

The invention relates to a magnetic measuring method for measuring the size and shape (profile) of a slot.

The invention also relates to an apparatus for determining the size and shape of a slot.

The method can be applied to measuring the thickness and, especially, the profile of a material web passing through a slot. As a special application the method can be used, among other things, for continuous measuring of the discharge opening (slice) of the head box of a paper machine.

DISCUSSION OF THE PRIOR ART

The size and profile of a slot can be measured with a known method based on eddy currents:

Let us suppose that the slot is limited underneath by an electrically conducting edge such as the lower lip 5 of the slot in FIG. 1. One measures at a high frequency (in the order of 100 kHz or more) changes in the inductance of a coil attached to the upper edge 2 of the slot. If a capacitor is connected in parallel with the coil, thereby forming a resonant circuit, one may measure changes in the resonant frequency of the circuit. The changes in the inductance or resonant frequency are proportional to the distance of the coil from the electrically conducting lower edge. A weakness of this method is its sensitivity to eddy currents induced into other electrically conducting structures surrounding the slot. For example, adjacent to the discharge opening of a paper machine there are often shield plates which in practice totally prevent the application of the eddy current method.

The size and profile of a slot can also be measured by means of a permanent magnet. As an example of this method, permanent magnets are attached at specified distances from each other to the lower edge 1 of the solution according to FIG. 1. The magnetic field created by them is measured by magnetometers attached to the upper edge 2 of the slot. The method based on permanent magnets has two essential weaknesses. Firstly, magnetization of permanent magnets is known to be dependent on temperature. If the method is required to be accurate and stable, the temperature of the permanent magnets must be stabilized or their magnetization measured must compensate for the changes in magnetization in the measurement results. Secondly, when operating with permanent magnetic fields disturbances caused by the environment are a problem. For example, an extra permanent magnet getting near to the magnetometers will distort the desired signal.

Known is also a method (the published FI specification 73831), wherein the thickness of a non-magnetic, especially moving material web is measured. In the method the material web moves touching a rotating non-magnetic cylinder to which a magnetic bar is connected. At the opposite side of the web the magnetic field caused by the bar is measured with a magnetoresistive sensor touching the material web. A weakness of even this method is the dependence of the signal on the magnetic properties of the bar in the cylinder, which may change because of changes in temperature, mechanical stresses etc. In addition, with one stationary magnetometer the profile of the material web can not be measured.

The profile of a slot can be measured by ultrasound for example as follows: At either side of the slot there is an ultrasound transmitter and receiver. Ultrasound propagates in the medium in the slot. By measuring the propagation time in the slot one may obtain the size of the slot at each ultrasound sensor when the propagation velocity of ultrasound in the medium in the slot is known. Propagation of ultrasound is dependent on the properties of the medium. For example, changes in temperature, pressure etc. of the medium must be compensated, which is an obvious weakness of the method.

The slot can also be monitored by means of optical methods. A weakness of these methods is, however, the dependence of the propagation of light on the optical properties of the medium. In addition, soiling of optical sensors in an industrial environment is a significant problem.

SUMMARY OF THE INVENTION

It is the purpose of this invention to provide a method and an apparatus of quite a novel type to solve the problems of the solutions of prior art.

The invention is based on a magnetic measuring method in which a current conductor disposed fixedly in at least one element of the slot is used to which conductor an alternating current of low frequency is applied. The strength, inversely proportional to the size of the slot, of the magnetic field caused by this alternating current is phase-lockedly measured with a magnetometer attached to the same and/or opposite element(s) of the slot.

It is an essential feature of the invention that the frequency of the alternating current is so low that eddy currents are not significantly induced into the electrically conducting parts of the slot or the surrounding structures. On the other hand, the frequency is selected to be high enough so that the magnetic disturbances of the environment do not impede the measurement.

One aspect of the present invention resides in a method for determining the size and shape of a slot, which method includes the steps of applying an alternating electric current to a current conductor attached to at least one edge of the slot to create a magnetic field, measuring the magnetic field using at least two magnetometers attached to at least one of the edges of the slot, phase-locking the measurement of the magnetic field with the applied electric current, and calculating the size and shape of the slot from the measured values of the magnetic field.

Still another aspect of the invention resides in an apparatus having magnetic field sensor means for measuring a magnetic field depending on the size and shape of the slot and a current conductor attached to at least one edge of the slot and to which an alternating electric current can be applied to create the magnetic field. The apparatus further includes means for phase-locking the measurement of the magnetic field with the applied alternating current, with the measured strength values of the magnetic field being dependent on the size and shape of the slot. The apparatus also has calculation means for calculating the size and shape of the slot from the measured values of the magnetic field.

The solution according to the invention has several advantages:

If some material is passing through the slot, such as for example gas or liquid, which is non-magnetic, nor is a good electrical conductor, the method does not cause any disturbance in the flow of the material. Reciprocally, such a material or its flow do not cause changes in the magnetic field either. Thus changes in the temperature, pressure, density, electrical conductivity, and many other properties of the medium do not affect the measuring method. When measuring the profile of the slot by means of ultrasound being reflected in the slot, changes in the temperature, pressure, and density of the medium in the slot affect the measurement result. Similarly, in optical measurement the properties of the medium in the slot, such as the refractive index or transmittance, may distort the measurement result. In magnetic methods there is no such problem as optical sensors getting dirty.

If the slot is comprised of electrically conducting material such as stainless or acid-proof steel, one may use an alternating current of so low a frequency that eddy currents induced into the steel structures do not produce any significant signal in the magnetometers. If for example all the structures drawn in FIG. 1 were made of acid-proof steel, the frequency may, according to the measurements, be even 100–500 Hz without the eddy currents significantly contributing to the signals.

The invention will be further discussed in the following with the aid of examples of embodiments according to the accompanying drawings.

BRIEF DESCRIPTION OF THE DRAWINGS

In the drawings, wherein like reference numerals delineate similar elements throughout the several views.

DETAILED DESCRIPTION OF THE PREFERRED EMBODIMENT

Figure 1:
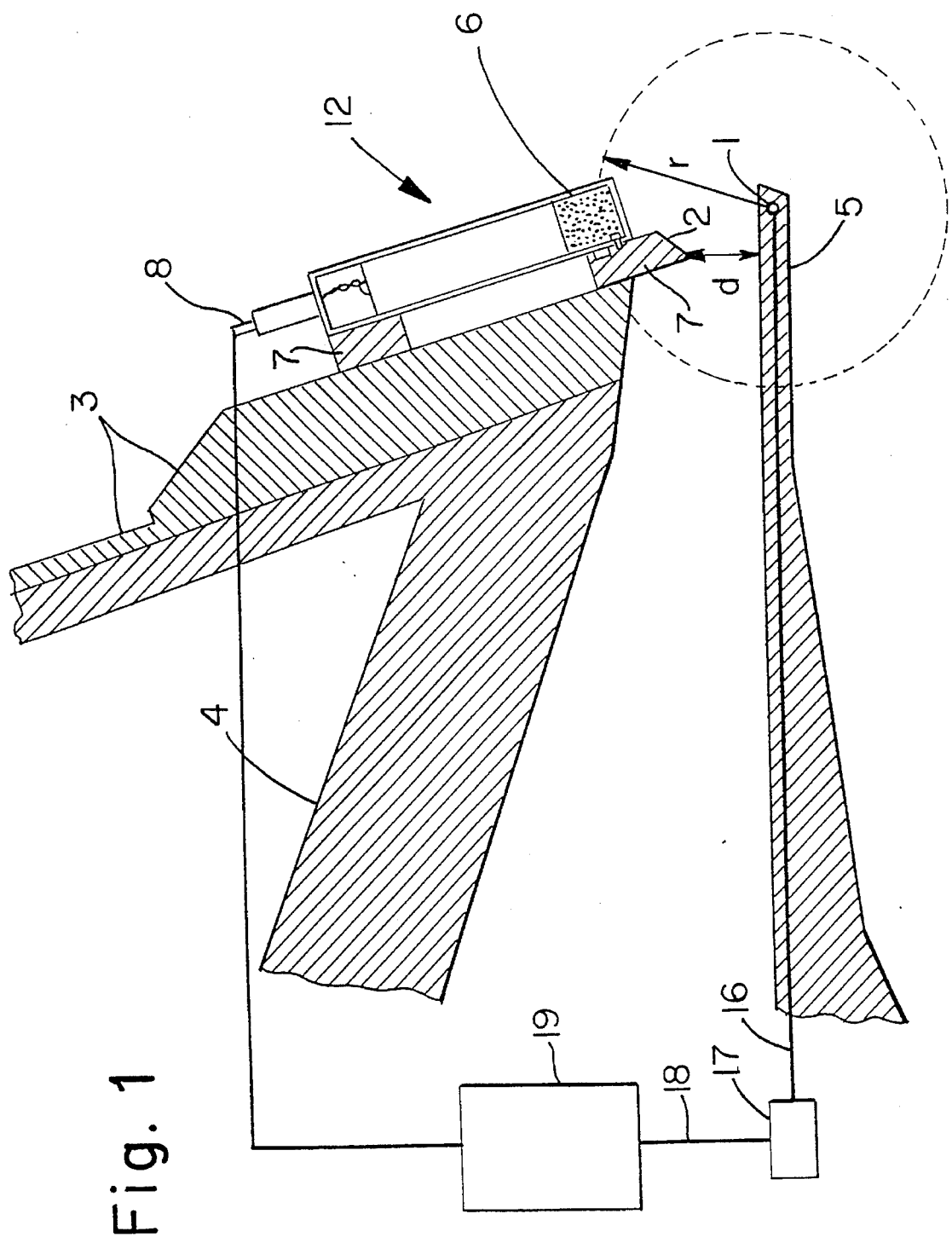
FIG. 1 illustrates, in a sectional side view, one measuring apparatus according to the invention.

One embodiment of the invention is illustrated in FIG. 1. To the lower edge 5 of a longitudinal slot (in FIG. 1 the discharge opening (slice) of the head box of a paper machine) there is attached a conductor 1, which moves and bends with the edge 5. An alternating current of low frequency is applied to the current conductor 1. The frequency is appropriately below 1000 Hz. The magnetic field caused by the electrical current is measured with sensor units 12 attached to appropriate positions at the upper edge 2 of the slot (in the figure to the tip list of the discharge opening of a paper machine), which sensor units comprise the magnetic field sensor or magnetometer 6. When the size of the slot changes at a certain point, the magnetic field measured by the sensor 6 changes at the same point. The sensor unit 12 is attached by way of fastening blocks 7 to the control body 3. In this case, the lower fastening block 7 is the tip list 2 of the discharge opening. The control body 3 is movable in relation to the framework 4 for controlling the distance d (size of the slot). Current conductor 1 is electrically connected by a line 16 to a current source 17 which is controlled through a line 18 by a microprocessor or computer 19. The data obtained by the sensor unit 12 is fed to the microprocessor 19 through a line 8. The microprocessor 19 also controls the operation of the sensor unit 12 through the line 8.

The magnetic field generated by a long current conductor can be approximatively calculated from the formula:

$$B = \mu_0/(2\pi) i/r, \qquad (1)$$

where $\mu_0$ to is the permeability of vacuum, i is the magnitude of the electrical current in the conductor and r is the distance from the conductor. From the formula and FIG. 1 one may see that with increasing distance d (size of the slot) the magnetic field decreases.

Ferromagnetic or ferrimagnetic material adjacent to the slot may distort the magnetic field produced by the current conductor. If this distortion is of constant magnitude, it does not cause any trouble, since it is taken into account in the calibration of the method. The magnetic permeability of ferromagnetic material may change with time because of mechanical stresses, changes in temperature, etc.

Figure 2:
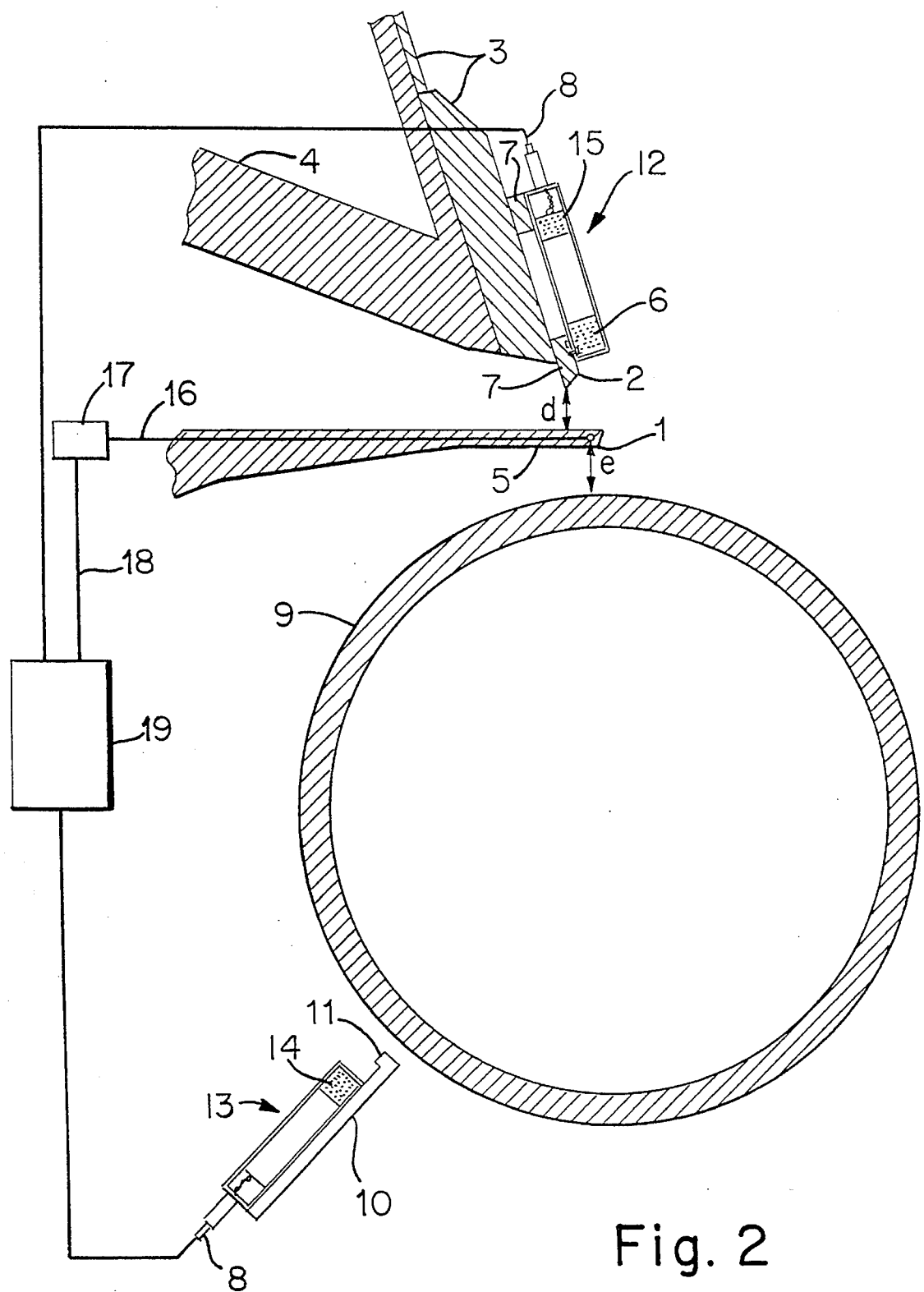
FIG. 2 illustrates an error correction/calibration apparatus connected to the apparatus according to FIG. 1.

In FIG. 2 there is illustrated how changes in permeability may be compensated for. The principle is to measure the changes in the permeability of ferromagnetic material and may be carried out as follows:

The magnetic body 9 adjacent to the slot may be periodically moving, such as a rotating breast roll 9 beside the discharge opening of a paper machine. This magnetic body 9 may cause a periodic disturbing signal in the magnetometers 6. The effect of the disturbing signal is eliminated from the measurement result, if the application of the alternating current and thereby the detection of all the measurement is synchronized with the periodic disturbing signal. The movement, vibration or rotation of the magnetic body 9 may be measured, for example, with a separate magnetometer 14 or some other sensor such as a tachometer.

The movement of the magnetic body 9, such as the breast roll of a paper machine, may be measured as follows.

One places a sensor unit 13 comprising a magnetometer 14 and a current conductor 11 attached to the same block 10 at a fixed distance from ferromagnetic material 9. The current conductor 11 may be a part of the same conductor 11 which exites the magnetic field in the area of the slot being measured. One has to take care that this part of the current conductor does not cause any significant magnetic field in the magnetometers 6 measuring the slot. The data obtained by the sensor unit 13 is fed to the microprocessor 19 through a line 8. The microprocessor 19 also controls the operation of the sensor unit 13 through the line 8. From the changes in the output of the magnetometer 14 the effects of permeability and the movement of material may be calculated.

Adjacent to the discharge opening of a paper machine there is a rotating breast roll, which is electrically conducting and, mostly, also made of ferromagnetic steel. The breast roll causes two phenomena, which must be taken into account when applying the method according to the invention:

1) An electrically well conducting material, such as metal moving in the magnetic field, distorts the magnetic field. Therefore the rotating breast roll of a paper machine or of a board machine causes distortion of the magnetic field proportional to the rotational speed of the roll. The distortion caused by the rotation may, however, be taken into account in the calibration stage by measuring the signals of the magnetic field sensors as a function of the rotational speed of the breast roll. The rotation of the breast roll can be measured with a magnetometer which measures the magnetic field component which is parallel to the radius of the breast roll and perpendicular to the electrical current in the current conductor.

2) Since the breast roll is of magnetic material (its relative magnetic permeability is typically 200–1000), it also causes distortion of the field. The effect of distortion is mainly taken into consideration in the calibration stage of the method. In the calibration stage the lower lip may not be bent, however. When the paper machine is running the lower lip will be bent. Therewith the discharge opening is increased and the current conductor will move nearer to the magnetic breast roll. When the discharge opening is increased, the magnetic field is decreased at the sensors, but when the current conductor moves nearer to the breast roll, the magnetic field, in turn, tends to become stronger because of the magnetization of the breast roll. These two phenomena cause an opposing effect, especially the signal change resulting from the change in the discharge opening is always greater than the effect resulting from the magnetization of the breast roll. In the calibration stage it is difficult to move the lower lip in relation to the breast roll. The phenomenon can be taken into account computationally. If the magnetic permeability of the breast roll is very high ($\mu_r$>1000) and the measuring frequency used is low (f< 1 Hz), the magnetic field may be calculated, instead of with the formula 1, from the formula $$B=\mu_0 /(2\pi) \; i \; [1/r+1/(r+2e)], \quad (2)$$

where e is the distance of the current conductor from the surface of the breast roll. When the lower lip is bent, the distance r between the current conductor and magnetometer is increased, and simultaneously the distance e between the current conductor and the surface of the breast roll is decreased. Other magnetometers 15 are placed in the sensor units 12 at fixed distances from the magnetometers 6. From the signals of the magnetometers 6 and 15 the unknown variables r and e may be calculated.

If the measuring frequency is very high (f>100 kHz), the eddy currents induced in the breast roll affect the magnetic field. In this case the magnetic field may, instead of the formulas 1 and 2, be calculated from the formula $$B=\mu_0/(2\pi) \; i \; [1/r-1/(r+2e)], \quad (3)$$

independent of the magnetic permeability of the breast roll. From the formulas 2 and 3 one may see that there is a frequency $f_c$ at which the effect of the breast roll to the magnetic field will disappear: the terms + 1/(r+2e) and −1/(r+2 e) cancel each other at this frequency. Typically this frequency is $f_c$<1000 Hz. If the measuring frequency is so selected, the vibration of the breast roll also does not affect the measurement result. The measuring frequency $f_c$ may be found in such a way that one examines the signals of the magnetometers at different excitation frequencies. As the measuring frequency, a frequency $f_c$ is selected at which the disturbance caused by the vibration and/or movement of the ferromagnetic material adjacent to the current conductor in the signals of the magnetometers 6 is at minimum. Advantageously the movement of the ferromagnetic material is measured with a magnetic field sensor which measures the magnetic field component perpendicular to the current in the current conductor (1) and to the movement of the ferromagnetic material.

As magnetic field sensors 6, 14, 15 magnetoresistive transducers, Hall induction coil transducers or so-called flux-gate transducers may be utilized.

The change in the magnetic field caused by the eddy currents induced in the electrically conducting material adjacent the slot may be compensated for by measuring the magnetic signal of the eddy currents. By means of the measured magnetic field caused by the eddy currents the effect of change is compensated for in the measurement signal proper.

Figure 3:
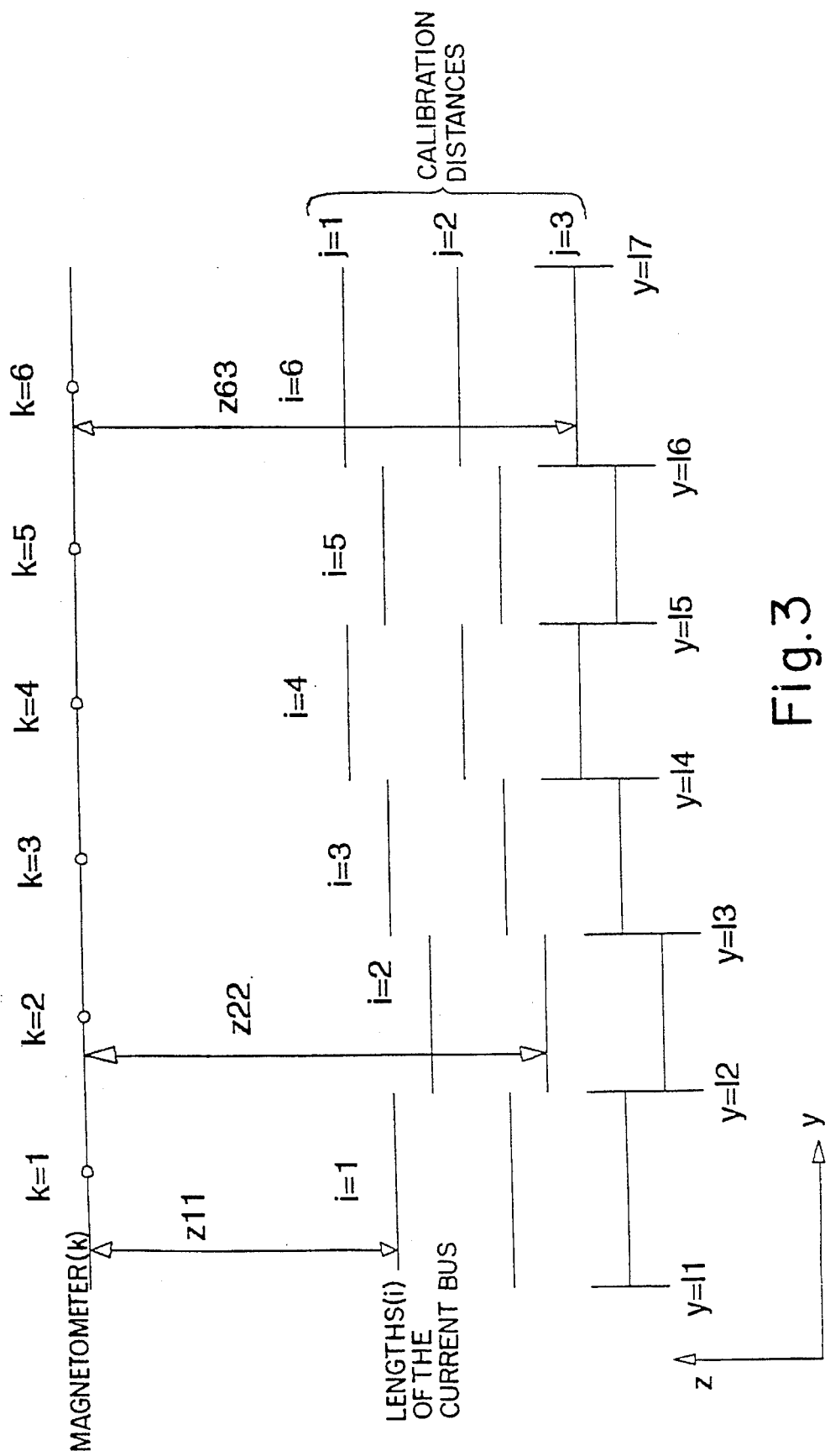
FIG. 3 schematically illustrates the variables used in the calculation model.

Calculation of the profile of the slot is described in the following with reference to FIG. 3.

With the method disclosed, the profile of the discharge opening may be calculated in the embodiment of the invention according to FIG. 1 and 2. The average size of the slot in the area of each magnetometer can be unambiguously determined by solving the so-called inverse problem.

According to the Biot-Savart law, the magnetic field created by a current conductor at a certain point is an integral, weighted in a certain way, over the current conductor as a whole. By constructing an appropriate mathematical model for the magnetic field caused by the current conductor the position and shape of the current conductor may be unambiguously determined within the bounds of the model. If the magnetic field is known in only n points of the space, only n free parameters may be used in the determination of the position of the current conductor. The problem is discussed according to the definitions of FIG. 3. The current conductor is divided into n pieces, the distance of which is an unknown parameter. The inverse problem is solved so that first a model for the magnetic field created by the magnetic field is constructed. The model is fitted with the measurement results in the calibration stage of the apparatus. When actually using the apparatus the profile of the slot is calculated from the values of the magnetic field by means of the model.

A model for the Direct Problem

Let us take as the model the magnetic field caused by a length of the current conductor. From the Biot-Savart law one obtains easily that:

$$B_x(X = 0, y_1, y_2, z) = \quad (4)$$

$$\frac{\mu_0}{4\pi} \; i \; z \int_{y_1}^{y_2} d\acute{y} \; (z^2+\acute{y}^2)^{-3/2} =$$

$$\mu_0/(4\pi)i[y_2(y_2^2 + z^2)^{-1/2} - y_1(y_2^2 + z^2)^{-1/2}]/z$$

The magnetic field caused by the current conductor as a whole is obtained by summing together the fields caused by different lengths.

Let us designate that $z_1$ is the average size of the discharge opening at a length i of the current bus. Based on the formula 4 a model directly for the solution of the problem is written:

$$B_k(z_1, z_2, \ldots, z_N)=a(z_k) \Sigma T_{ki} \quad (5)$$

where summing goes over all the lengths of the current bus. The functions $T_{ki}$ are $$T_{ki} = \frac{1}{r+z_1} \left( \frac{l_{i+1} - y_k}{\sqrt{(l_{i+1} - y_k)^2 + (r + z_i)^2}} - \frac{l_i - y_K}{\sqrt{(l_i - y_k)^2 + (r + z_i)^2}} \right) \quad (6)$$

In the formula 6, r is a free parameter which is fitted with the measurement results. The other constants in the formula 6 will become apparent from FIG. 3. By means of the functions $a(z_k)$ the model is caused to fully match with the measurement results at the calibration points. Since the signal measured by the magnetometer is, for the most part, derived from the length of the current conductor directly below it, with $z_k$ being between the calibration points $z_{k,j}$ and $z_{k,j+1}$, the functions can be calculated, for example, from a linear approximation:

$$a(z_k)=[a_{kj}(z_{k,j+1}-z_k)+a_{k,j+1}(z_k-z_{kj})]/(z_{k,j+1}-z_{kj}). \quad (7)$$

Calibration Procedure and Fitting of the Model

The calibration procedure is as follows:

The outputs $M_{kj}$ of the magnetometers k, and the sizes $z_{ij}$ of the discharge opening are measured. The parameter r of the model is found as follows: Let us provisorily suppose that the function $a(z_k)$ is a constant=a and one finds, in the sense of least squares, the best fit model of the formula 5 with the measurement results. This model does not, in general, completely match with the measurement results, because they contain noise and/or because the field may be distorted because of. e.g., adjacent ferromagnetic material. The value r thus obtained is substituted in the formula 5 and the parameters $a_{kj}$ are calculated so that the values $B_{kj}$ given by the model unite with the measurement results $M_{kj}$ in all measurement points k and j:

$$a_{kj}=M_{kj}/\Sigma_i T_{ki}(z_k=z_{kj}). \quad (8)$$

Solving the Inverse Problem by Means of the Model

From the outputs $M_k$ of the magnetometers one should calculate the unknown sizes $z_i$ of the discharge opening. They are obtained by solving the group of equations $$B_k(z_1, z_2, \ldots, z_N)-M_k=0. \; k=1, \ldots, N. \quad (9)$$

Let us make use of a vector function $F(z)=B_k(z_1, z_2, \ldots z_N)-M_k$, the zeroes of which should be found. A classical way is iteration by means of, for example, Newton's algorithm:

$$\underline{z}^{n+1}=\underline{z}^n-[\delta \underline{F}(\underline{z}^n)/\delta \underline{z}]^{-1} \underline{F}(\underline{z}), \quad (10)$$

where $\delta \underline{F}(\underline{z}^n)\delta \underline{z}$ is a diagonally weighted matrix, the components of which are partial derivatives of the model 3 with respect to $z_i$:n: $[\delta \underline{F}(\underline{z}^n)/\delta \underline{z}]_{ki}=\delta B_k/\delta z_i$. The final result of the iteration shown is an exact solution of the inverse problem, because in the formula 5 the effect of all the lengths of the current conductor on the output of the magnetometer. The dimension of the matrix $\delta \underline{F}(\underline{z}^n)/\delta \underline{z}$ is equal to the number N of the magnetometers. The matrix must be compiled and inverted at each iteration cycle. The number of calculations is proportional to $N^3$, so an algorithm implemented in this way is not sensible if N is large. In practice it is sufficient to take into account only the effect of the nearest lengths of the current bus, whereby the number of calculations is essentially reduced.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. An apparatus for determining size and shape of a slot, comprising:

magnetic field sensors for measuring a magnetic field dependent on the size and shape of the slot;

a current conductor attached to at least one edge of the slot, to which current conductor an alternating electric current can be applied to create the magnetic field;

means for phase-locking the measurement of the magnetic field with the applied alternating current, wherein measured strength values of the magnetic field are dependent on the size and shape of the slot;

calculation means for calculating the size and shape of the slot from the measured values of the magnetic field; and at least one reference sensor operative to compensate for a change of the magnetic field caused by at least one of a magnetic and an electronically conducting material adjacent to the slot by measuring the magnetic field caused by the material and using the measured value for compensating for an effect caused by the material in the measurement result.

2. An apparatus according to claim 1, wherein the magnetic field sensor means includes at least two magnetometers, the current conductor being attached to one edge of the slot and the at least two magnetometers being attached to at least an opposing edge of the slot.

3. An apparatus according to claim 1, and further comprising means for measuring movement or rotation of at least one of a magnetic and an electrically conducting material adjacent to the current conductor, and at least one magnetic field sensor arranged and adapted to measure a component of the magnetic field perpendicular to the current in the current conductor and to movement of the material.

4. An apparatus according to claim 2 and further comprising additional magnetometers arranged at fixed distances from the at least two magnetometers.

5. An apparatus according to claim 1, wherein the calculation means is operative to calculate the size of the slot from signals on the magnetometers taking into account a distance of the current conductor in relation to at least one of an adjacent magnetic and an electrically conducting material, and movement of at least one of the magnetic and the electrically conducting material.

6. A method for determining size and shape of a slot by determining a magnetic field dependent on the size and shape of the slot, the method comprising the steps of:

applying an alternating electric current to a current conductor attached to at least one edge of the slot to create the magnetic field;

measuring the magnetic field using at least two magnetometers attached to at least one of the edges of the slot;

phase-locking the measurement of the magnetic field with the applied electric current;

calculating the size and shape of the slot from the measured values of the magnetic field; and compensating for a change of the magnetic field caused by magnetic material adjacent to the slot by measuring magnetic permeability of the magnetic material and compensating for an effect of the change from the magnetic field measurement signal by using the change of the measured permeability.

7. A method according to claim 6, including attaching the current conductor to one edge of the slot and attaching the magnetometers to at least an opposing edge of the slot.

8. A method according to claim 6, wherein the calculating step includes calculating a size and shape of the slot by inverse problem solving.

9. A method according to claim 6, including measuring for a change of the magnetic field caused by eddy currents induced to electrically conducting material adjacent to the slot by measuring a magnetic signal of the eddy currents, and compensating for an effect of the change on an actual signal by using the measured magnetic field caused by the eddy currents.

10. A method according to claim 6, including eliminating effects of magnetic disturbance caused by periodic movement, rotation or vibration and presence of an electrically conducting material adjacent to the slot from the measuring result by measuring a change of the signal resulting from movement, rotation or vibration of the electrically conducting material and by synchronizing application of the alternating current with the periodic disturbance.

11. A method according to claim 6, including measuring one of movement and rotation of a material that is at least one of magnetic and electrically conducting and that is adjacent to the current conductor, and the calculating step taking into account a signal change caused by one of the movement and rotation of the material.

12. A method according to claim 11, including measuring the movement of the at least one of magnetic and electrically conducting material with a magnetic field sensor that measures a component of the magnetic field perpendicular to the current in the current conductor and to the movement of the material.

13. A method according to claim 6, wherein the magnetic field measuring step includes measuring the magnetic field with additional magnetometers at fixed distances from the at least two magnetometers.

14. A method according to claim 6, wherein the calculating step includes calculating the size of the slot by taking into account a variation of a distance of one of a magnetic and an electrically conducting material that is adjacent to the slot in relation to the current conductor.

15. A method according to claim 6, including selecting one of a measuring frequency and a frequency of the alternating current so that vibration and variation of distance of a magnetic or electrically conducting material adjacent to the slot do not affect measurement results.

16. A method according to claim 6, including selecting one of a measuring frequency and a frequency of the alternating current so that signals from the magnetometers are examined at different frequencies of the alternating current, and selecting as the measuring frequency the frequency of the alternating current at which a disturbance to the signals of the magnetometers caused by at least one of vibration and movement of a magnetic or electrically conducting material adjacent to the current conductor is minimized.

17. A method for determining size and shape of a slot by determining a magnetic field dependent on the size and shape of the slot, the method comprising the steps of:

applying an alternating electric current to a current conductor attached to at least one edge of the slot to create the magnetic field;

measuring the magnetic field using at least two magnetometers attached to at least one of the edges of the slot;

phase-locking the measurement of the magnetic field with the applied electric current;

calculating the size and shape of the slot from the measured values of the magnetic field; and measuring for a change of the magnetic field caused by eddy currents induced to electrically conducting material adjacent to the slot by measuring a magnetic signal of the eddy currents, and compensating for an effect of the change on an actual signal by using the measured magnetic field caused by the eddy currents.

18. A method according to claim 17, including attaching the current conductor to one edge of the slot and attaching the magnetometers to at least an opposing edge of the slot.

19. A method according to claim 17, wherein the calculating step includes calculating a size and shape of the slot by inverse problem solving.

20. A method according to claim 17, including eliminating effects of magnetic disturbance caused by periodic movement, rotation or vibration and presence of an electrically conducting material adjacent to the slot from the measuring result by measuring a change of the signal resulting from movement, rotation or vibration of the electrically conducting material and by synchronizing application of the alternating current with the periodic disturbance.

21. A method according to claim 17, including measuring one of movement and rotation of a material that is at least one of magnetic and electrically conducting and that is adjacent to the current conductor, and the calculating step taking into account a signal change cause by one of the movement and rotation of the material.

22. A method according to claim 21, including measuring the movement of the at least one of magnetic and electrically conducting material with a magnetic field sensor that measures a component of the magnetic field perpendicular to the current in the current conductor and to the movement of the material.

23. A method according to claim 17, wherein the magnetic field measuring step includes measuring the magnetic field with additional magnetometers at fixed distances from the at least two magnetometers.

24. A method according to claim 17, wherein the calculating step includes calculating the size of the slot by taking into account a variation of a distance of one of a magnetic and an electrically conducting material that is adjacent to the slot in relation to the current conductor.

25. A method according to claim 17, including selecting one of a measuring frequency and a frequency of the alternating current so that vibration and variation of distance of a magnetic or electrically conducting material adjacent to the slot do not affect measurement results.

26. A method according to claim 17, including selecting one of a measuring frequency and a frequency of the alternating current so that signals from the magnetometers are examined at different frequencies of the alternating current, and selecting as the measuring frequency the frequency of the alternating current at which a disturbance to the signals of the magnetometers caused by at least one of vibration and movement of a magnetic or electrically conducting material adjacent to the current conductor is minimized.

* * * * *